United States Patent [19]

Malish

[11] 4,391,548

[45] Jul. 5, 1983

[54] COUPLING DEVICE FOR FLOOR MAINTENANCE MACHINES

[76] Inventor: Terrance J. Malish, 2520 Red Fox Pass, Willoughby Hills, Ohio 44094

[21] Appl. No.: 225,368

[22] Filed: Jan. 15, 1981

[51] Int. Cl.$^3$ .......................... B25G 3/00; F16D 1/00

[52] U.S. Cl. ............................ 403/348; 403/DIG. 7; 403/11

[58] Field of Search .............. 403/348, 349, 350, 351, 403/353, 11

[56] References Cited

U.S. PATENT DOCUMENTS

| | | | |
|---|---|---|---|
| 2,541,526 | 2/1951 | Lundquist | 403/348 |
| 2,873,131 | 2/1959 | Metrailer | 403/348 |
| 4,286,159 | 8/1981 | Kitta et al. | 403/348 X |
| 4,373,828 | 2/1983 | Sartori | 403/348 X |

*Primary Examiner*—Wayne L. Shedd
*Attorney, Agent, or Firm*—Watts, Hoffmann, Fisher & Heinke Co.

[57] ABSTRACT

A coupling device adapted for use with floor maintenance machines of the type such as floor brushing, buffing, polishing, scrubbing or the like which enables automatic coupling of the maintenance element (i.e. brush, buffing disc or the like) without direct manual implementation thereof. The device includes an annular plate member having a circular opening adapted to receive a circular mounting flange carried by the machine drive shaft with the drive shaft having radially projecting lugs which are adapted to pass through radially extending arcuate recesses formed in the plate member so as to lockably engage behind the plate member. On one side of the plate member a first series of inner peripheral cam-like ramps communicate with one end the arcuate recesses and on the opposite side of the plate member a second series of inner peripheral cam-like ramps communicate with the opposite ends of the arcuate recesses. The second series of cam-like ramps include multiple tapered surfaces which terminate in integral, arcuate segmental webs disposed generally axially opposite associated of the first series of cam-like ramps all of which component parts synergistically coact to enable automatic coupling and decoupling of the maintenance element.

11 Claims, 10 Drawing Figures

COUPLING DEVICE FOR FLOOR MAINTENANCE MACHINES

DESCRIPTION

1. Technical Field

The present invention relates to floor maintenance machines and more particularly relates to a new improved construction of a coupling device for units used with floor maintenance machines, such as for buffing, cleaning, polishing, scrubbing and the like maintenance type operations. Accordingly, in such machines it is important that the maintenance element (i.e. brush, buffing or polishing pad) be able to be quickly and easily installed and removed for multiple operations as well as for replacement after repeated usage particularly when employed for use with commercial maintenance machines of the type typically employed by janitorial and maintenance services in commercial, institutional or industrial facilities.

2. Background Art

Heretofore, it has been known to provide clutch plates for detachably mounting various maintenance elements to the floor maintenance machines. These prior arrangements have generally included a circular flange on the drive shaft of the machine, the flange being provided with radially extending lugs located below the flange. An annular clutch plate is secured to the maintenance element (i.e. brush, pad holder) with the plate including a central opening having radial recesses which enable the lugs to pass through the clutch plate so that when the clutch plate is rotated relative to the flange, the lugs move behind the clutch plate so as to prevent axial removal of the clutch plate relative to the flange. Heretofore, to restrict turning movement of the clutch plate relative to the flange, the clutch plate has generally been provided with solid cast ramps (i.e. aluminum) so that the lugs ride-up the ramps until the lugs jam against the ends of ramps in the installed position.

It has been recognized, however, that such prior coupling arrangements are not completely satisfactory. For example, in these maintenance machines the high starting torque oftentimes causes the clutch plate to become tightly wedged in place since the coupling is designed such that rotation of the machine shaft tends to tighten the coupling. In other words, the coupling is designed to lock in the direction of rotation of the machine drive shaft. Accordingly, with this wedging or binding effect, it becomes difficult to remove the maintenance element for any purpose. In addition, such wedging or binding, whether caused by the high starting torques or by reason of the assembly or construction of the coupling itself, causes not only undue wear but possible damage to the drive lugs and/or clutch plate which not only creates costly replacement problems but also results in extended operator and machine downtime. Furthermore, this wedging or binding action often times causes abrading of the lugs or ramps so that it is difficult to achieve a tight coupling between the component parts with the ultimate result that the maintenance element acts to oscillate off-center or vibrate to the extent that good results cannot be achieved in the floor to be cleaned, polished, scrubbed or the like. In other words, such condition results in an unsatisfactory floor finish. Still further, such prior coupling arrangements require the operator to lift or tilt the machine in order to enable the operator to manually engage the clutch plate member to the lugged flange on the machine drive shaft. This, of course, requires additional operator time which often times prompts the operator not to take the time to replace the maintenance element after it has become soiled or damaged resulting in unsatisfactory performance. Further, such failure to remove the maintenance element results in damage as actual destruction to the element because of the machine weight, particularly after prolonged periods of time in storage.

A further problem with prior coupling devices relates to the "galvanic" action between the dissimilar metals (i.e. aluminum to steel) on the drive shaft and the clutch plate. This combination results in corrosion between the parts and compounds the "galling" of the lugs or ramps which makes it extremely difficult to remove the brush or pad holder from the machine. This problem can become extremely severe in moist and/or wet conditions and where chemicals are introduced which act to accelerate the corrosion between the parts. Accordingly, when the clutch plate has to be broken-away from the lugs, the opportunities to reuse the clutch plate without repair are minimized since the plate does not effectively accommodate (i.e. size and shape) itself to the drive shaft lugs.

DISCLOSURE OF INVENTION

The present invention relates to a coupling device for floor maintenance machines, said coupling device being arranged and constructed to enable automatic coupling and decoupling of the maintenance element (i.e. brush, buffing pad holder or the like) without direct manual implementation thereof. In the invention, the coupling device includes an annular plate member having a central opening adapted to receive therethrough the machine drive shaft which mounts an integral flange and a plurality of drive lugs disposed there below. The drive lugs are adapted to be received through a plurality of arcuate recesses which radially communicate with the opening in the plate member and which are adapted to turn behind the plate member for locking the plate member relative to the flange upon rotation of the machine drive shaft. The plate member includes a first series of inner peripheral cam-like ramp portions on one side thereof and a second series of inner peripheral cam-like ramp portions on the opposite side thereof with said first and second series of cam-like ramp portions being disposed on opposite ends of the associated recesses. The second series of cam-like ramp portions include multiple tapered surfaces which terminate in integral arcuate segmental webs which are disposed generally axially opposite associated of the first series cam-like ramp portions. The cam-like ramp portions, recesses and webs are arranged and constructed for synergistic coaction between the component parts so as to enable automatic coupling and/or decoupling of the maintenance element (i.e. brush, pad holder) with the machine drive shaft without the need for direct manual implementation and/or intervention, as in the case of prior coupling arrangements.

BEST MODE FOR CARRYING OUT THE INVENTION

Figure 1:
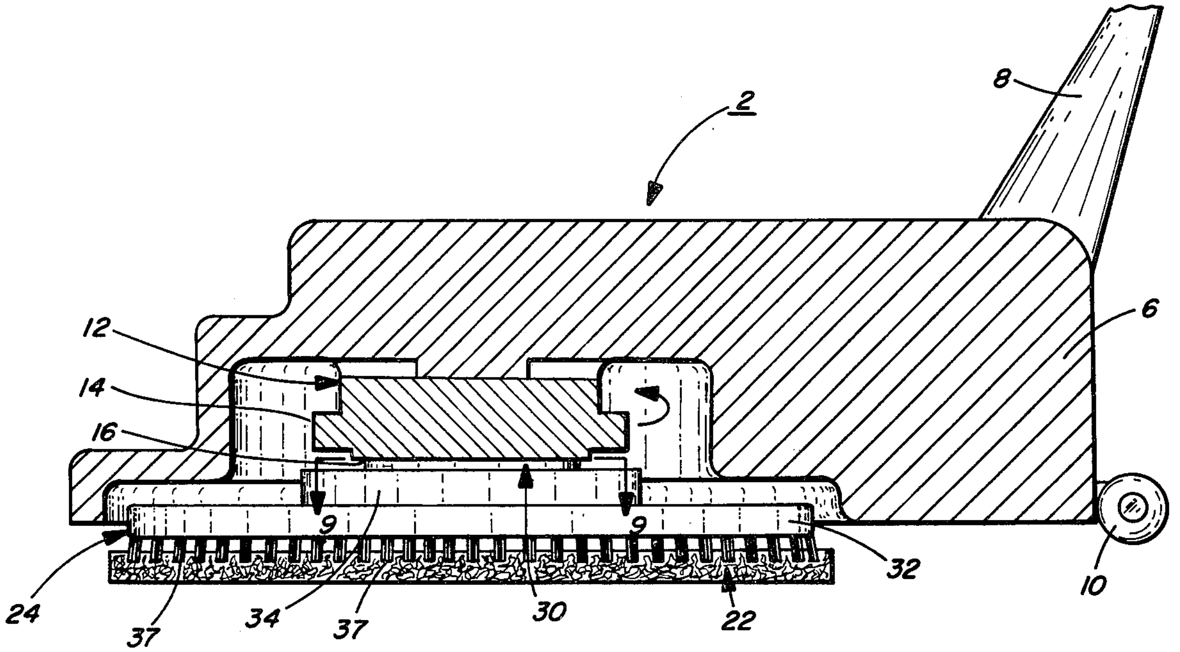
FIG. 1 is a fragmentary, generally vertical section view illustrating the coupling device of the present invention mounted for use with a conventional type floor maintenance machine.

Referring again to the drawings and particularly to FIG. 1 thereof, there is illustrated a conventional type floor maintenance machine, designated generally at 2, for use in various maintenance applications. Typically, such type of floor maintenance machine may be utilized for various maintenance applications, such as buffing, cleaning, polishing, scrubbing or the like for commercial, institutional and/or industrial applications.

Figure 2:
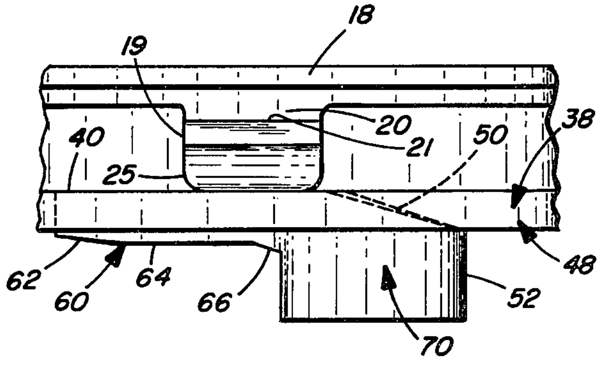
FIG. 2 is a fragmentary, generally schematic view illustrating an initial starting position for automatic coupling of the maintenance element to the machine via the coupling device of the invention.
Figure 3:
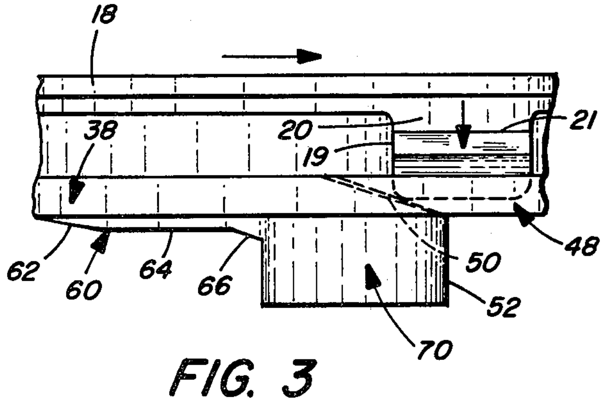
FIG. 3 is a fragmentary, generally schematic view illustrating a further position of the component parts for coupling the maintenance element to the machine via the coupling device of the invention.
Figure 9:
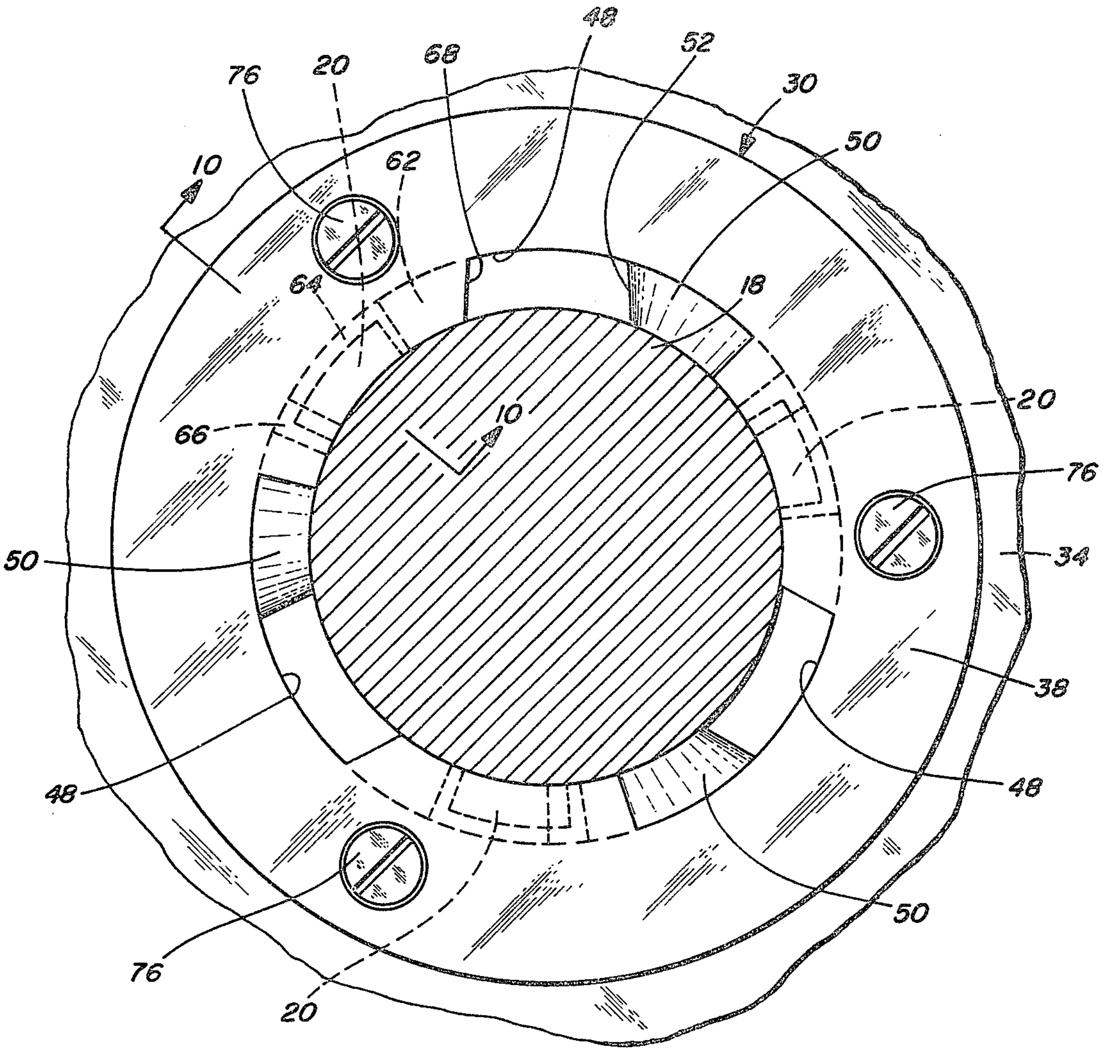
FIG. 9 is a fragmentary section view taken on the line 9—9 of FIG. 1 on an enlarged scale.
Figure 10:
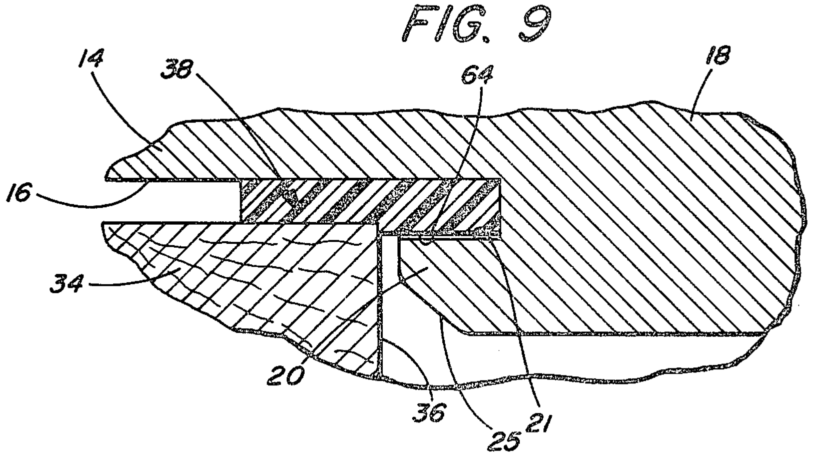
FIG. 10 is a fragmentary section view taken on the line 10—10 of FIG. 9.

In general, the machine includes a housing having a shroud 6 for movement via wheels 10 upon manipulation of a handle member 8. The machine 2 incorporates a drive shaft member 12, as known in the art, having an integral circular flange 14 which is fixed relative to the shaft for rotation therewith. The flange 14 defines a horizontally disposed, planar surface 16 from which depends (FIGS. 9 and 10) an integral circular drive hub 18. As best seen in FIGS. 9, and 10 the drive hub 18 includes a plurality (i.e. three 3) of integral, radially extending drive lugs 20 which are symmetrically spaced around the periphery of the drive hub 18 and are axially spaced from the planar under surface 16 of the drive shaft member 12. The lugs 20 have flat sides 19 and a ledge surface 21 (FIGS. 2 and 3) which may be rounded as at 25, to give the shape illustrated in FIG. 10.

As is known in the art, the drive shaft member 12 is actuated by an electric motor for rotating a maintenance element 22, such as a stripping, scrubbing or polishing pad. The maintenance element 22, in turn, is detachably mounted by a pad holder, designated generally at 24. The pad holder 24 is arranged and constructed for use with the novel coupling device, designated generally at 30, made in accordance with the present invention, and as will hereinafter be more fully described.

In the invention, the pad holder 24 is of the type described and claimed in applicants U.S. Pat. No. 4,114,225. Generally, the pad holder includes a circular wood support block member 32 which mounts a wood riser member 34. The riser member 34 is provided with a circular opening 36 (FIG. 10) adapted to receive the coupling device 30 therein. The block member 32 incorporates a plurality of plastic bristles 37 (FIG. 1) for frictionally mounting the pad 22, as is more fully described in aforesaid U.S. Pat. No. 4,114,225.

Figure 5:
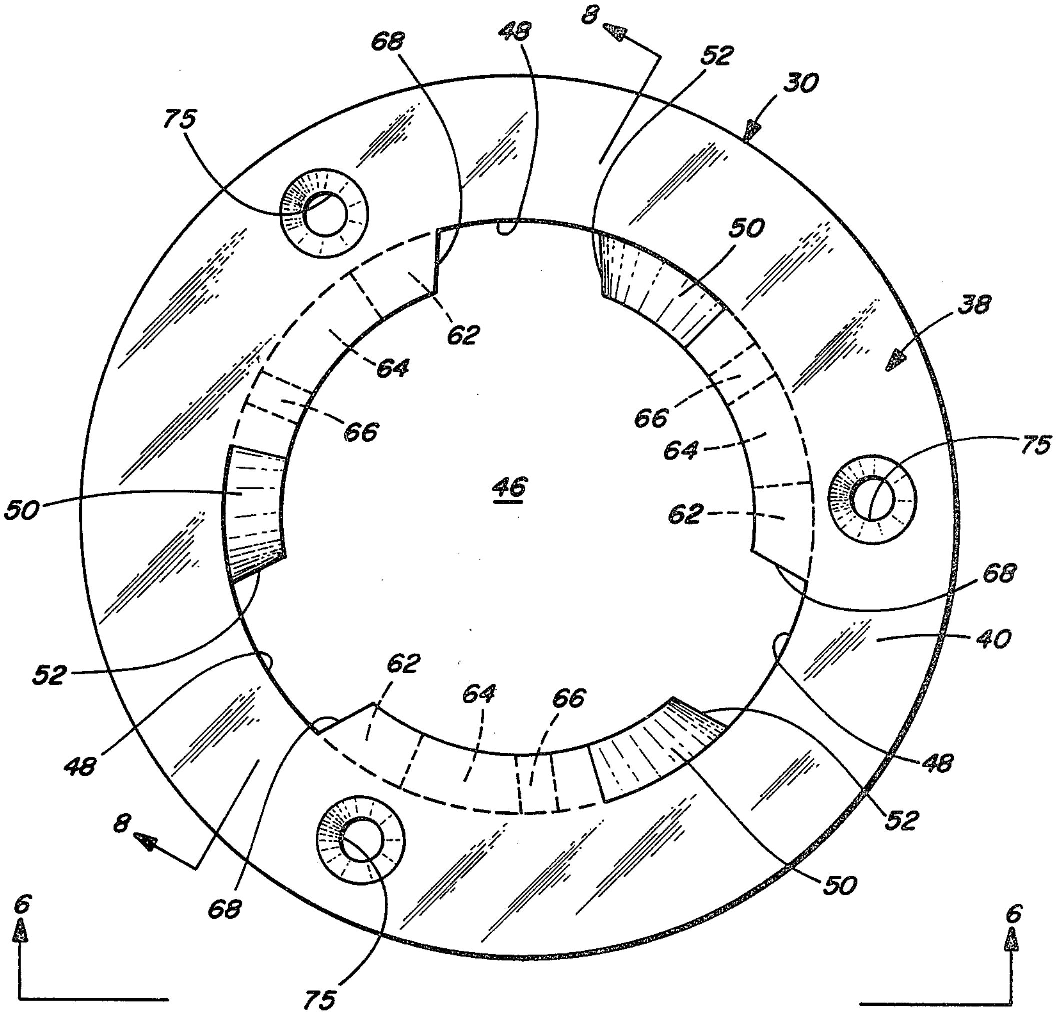
FIG. 5 is a top plan view of the coupling device of the invention removed from the machine for purpose of clarity.
Figure 6:
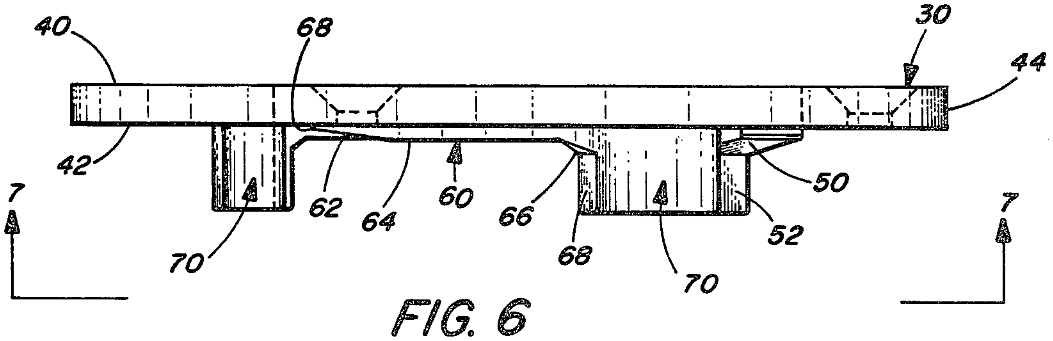
FIG. 6 is a side elevation view looking along the line of 6—6 of FIG. 5.

Now in accordance with the invention, the coupling device 30 provides an automatic drive coupling between the drive shaft 12 of the machine and the pad holder assembly 24. The device 30 includes a generally circular, flat plate member, designated generally at 38, (FIG. 5). The plate member 38 has generally planar upper surface 40 and planar lower surface 42 with a smooth circular outer peripheral surface 44, as best illustrated in FIG. 6. Preferably, the plate member 38 is fabricated from a high strength polymeric material, such as a thermo plastic, polyester resin. For example, preferred results have been achieved by a resin material commercially available under the registered trademarks "RYNITE" and "VALOX".

In the form shown, the plate member 38 includes a concentric circular opening 46 of a size to closely receive therethrough the drive hub 18 (FIG. 10) with the axial thickness of the plate member being slightly less than the corresponding axial distance between the under surface 16 and the ledge surface 21 of the lugs 20. The plate member 38 has a plurality of circumferentially extending arcuate recesses 48 set inwardly from the opening 46 which are equal in number. The screws are disposed in a predetermined circumferential oriented relation in respect to the lugs 20 when the drive hub is inserted within the opening 46.

Figure 8:
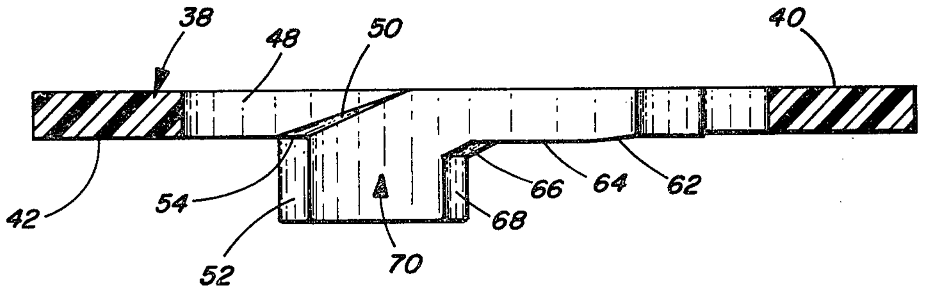
FIG. 8 is a vertical section view taken along the line 8—8 of FIG. 5.

Looking at the top surface 40 and spaced intermediate the recesses 48, as illustrated in FIG. 5, there are located a first series of cam-like ramp portions 50 which correspond in number to the number of recesses 48. Looking in a counter-clockwise direction in FIG. 5, the ramp portions 50 have generally helical surfaces which taper helically downwardly and inwardly so as to terminate, as at 52, at an end defining the side wall of an associated recess 48. As best illustrated in FIG. 8, the ramp portions 50 are tapered slightly downwardly and inwardly in a helical fashion toward the geometric center of the opening 46. The ramp portions 50 terminate, as at 54, in an inclined edge which extends downwardly and inwardly and slightly below the general plane of the under surface 42 of the plate member 38.

Figure 7:
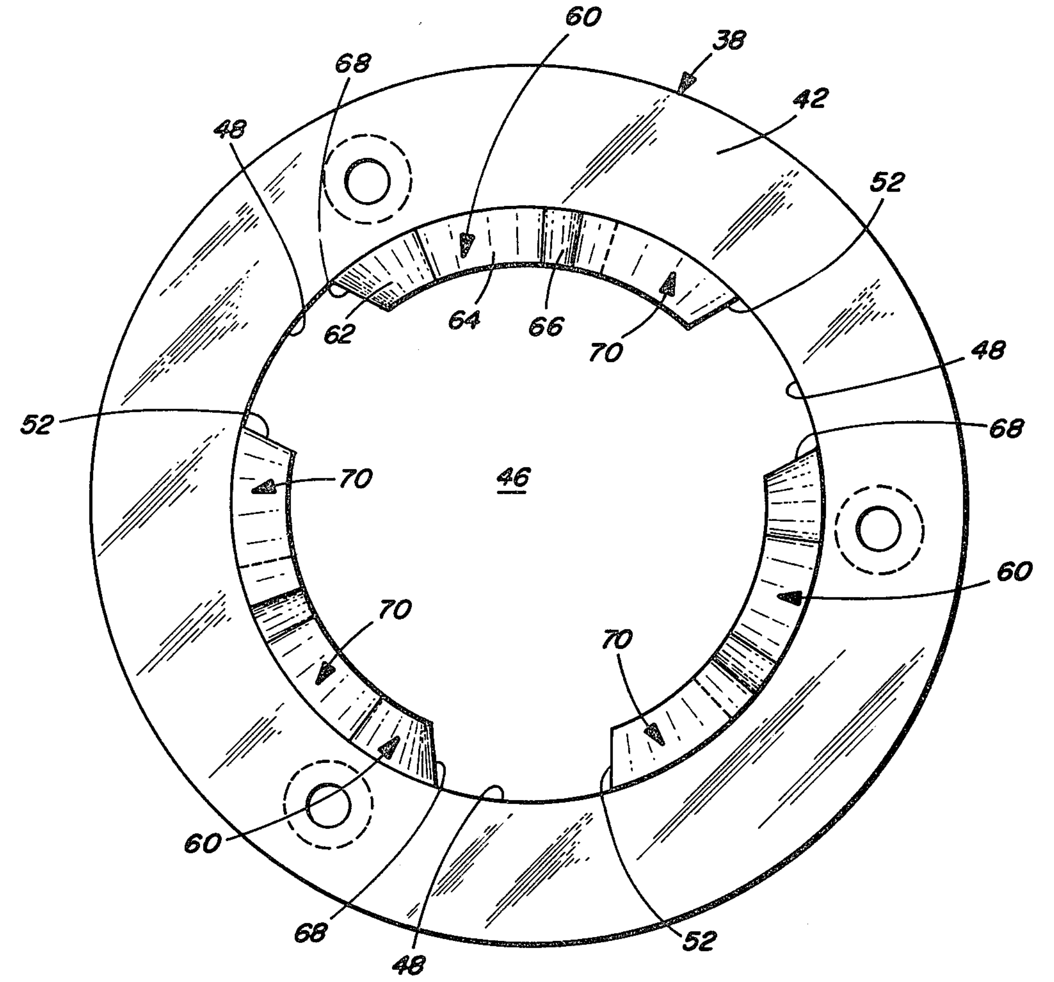
FIG. 7 is a bottom plan view looking in the direction of the line 7—7 of FIG. 6.

As best illustrated in FIG. 7, the bottom surface 42 of the plate member 38 includes a second series of cam-like ramp portions, designated generally at 60, which define with the first series of cam-like ramp portions 50 generally arcuate, segmental sections which act to define the interior periphery of the central opening 46. In the embodiment illustrated, the ramp portions 60 each include multiple inclined surfaces which can best be described when considered in a clockwise direction and also with reference to FIGS. 6 and 8. Accordingly, each ramp portion 60 includes a first inclined surface 62 which extends upwardly to merge with a second surface 64 which is generally planar. This surface, 64 in turn, merges into a second inclined surface 66 which provides a deformable abutment action for ultimate locking engagement with the associated lugs 20. The first inclined surfaces 62 merge with side walls 68 which side walls 52 (FIG. 7) define the associated recesses 48 therebetween. The side walls 52 and 68 preferably diverge slightly outward from one another toward the longitudinal central axis of the opening 46.

In the invention, the second inclined surfaces 66 of the ramp portions 60 terminate at integral, arcuate web portions 70 which correspond in number to the number of lugs 20 and recesses 48. The webb portions 70 are defined by the side walls 52 and 68 with the side walls 52 merging into the first series of inclined ramp portions 50 and the surfaces 68 merging into the inclined surfaces 66 of the second series of ramp portions 60. The web portions 70 project vertically away from the under surface 42 of the plate member 38 and are disposed generally axially below the associated ramp portions 50 of the first series. The web portions 70 have inner arcuate surfaces which together with the corresponding arcuate surfaces of the associated ramp portions 50 and 60 define the inner periphery of the central opening 46. As seen in FIGS. 5 and 8, the first and second series of ramp portions are off-set circumferentially from one another and with the side walls 68 of the web portions being generally set at the point of demarcation therebetween. In the invention, the plate member 38 is provided with a plurality, such as three, apertures 75 adapted to receive a threaded fastener 76, such as screws and the like, therethrough. By this arrangement, the plate member can be fixedly attached to the riser block 34 so that the parts can be joined, as a unit, to the drive shaft member 12 for rotation therewith. Preferably, the apertures 75 are disposed radially outwardly of and generally opposite the inclined surfaces 62 to maximize the strength characteristics of the coupling device.

Figure 4:
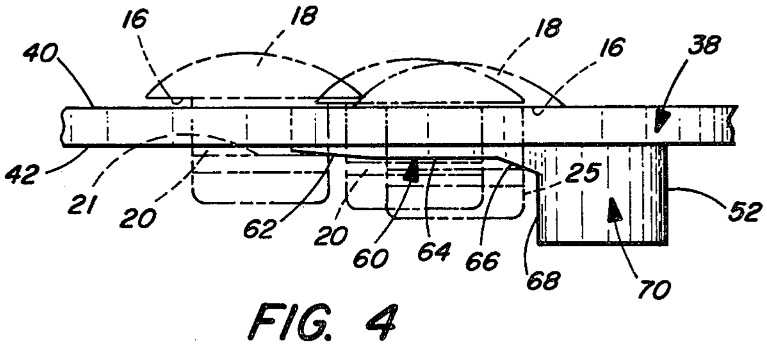
FIG. 4 is a fragmentary, generally schematic view illustrating, in broken and solid lines, the interlocking movement between the component parts for automatically coupling the maintenance element to the machine via the coupling device of the invention.

For further ease of clarity, there is hereinafter provided a general description of a typical operation of the coupling device of the invention for use in a floor maintenance machine. To connect the pad holder assembly 24 to the drive shaft 12 so that the assembly including the pad 22 will be driven by the shaft 12 upon actuation of the motor drive unit by the operator, the pad holder assembly 24 which fixedly carries the attached coupling device 30 is simply placed on the floor in the area to be treated. The floor maintenance machine is tilted or "heeled" back and then generally centered over the pad holder assembly 24 and clutch plate device 30. The operator then simply actuates the motor drive which rotates the drive shaft 12 in a counter-clockwise direction, as generally indicated by the arrow in FIG. 1. In this initial start-up position, the drive lugs 20 are typically disposed in engaged relation on the upper surface 40 of the plate member 38 (FIG. 2) such that upon counter-clockwise rotation of the drive shaft 12 the lugs 20 ride down the first inclined ramp portions of 50 (FIG. 3) until the lugs 20 drop through the associated recesses 48. During this action, the confronting side surfaces, as at 19, of the associated lugs 20 drop vertically downwardly in generally parallel relationship with the confronting surfaces 52 and 68 defining the associated recesses 48. In this position, the upper ledge-like surface 21 of the lugs 20 are disposed below the general plane of the under surface 42 of the plate member 38, as best illustrated in FIG. 4. Continued rotation of the drive shaft 12 and hence, the lugs 20 in a counter-clockwise direction causes the ledge-like surfaces 21 of the associated lugs 20 to ride up the first series inclined surfaces 62 which together provide, in effect, guides onto the associated ramp portions 60. The lug surfaces 21 then engage the generally planar ramp surfaces 64 and then engageably coact with the second series of inclined surfaces 66 which provide a deformable abutment action between the associated parts so as to draw the cam-plate member 38 vertically upwardly into tight frictional engagement with the confronting surface 16 of the drive hub 18, as best illustrated in the broken-line representation of FIG. 4. Continued rotation of the drive shaft 12 drives the confronting edges of the lugs 20 into a deformable biting engagement into and with the inclined surfaces 66 such that the material is progressively and slightly deformed or worn away until the side surfaces, is at 25, of the lugs 20 are brought into abutting engagement against the confronting surfaces 68 of the associated web portions 70 (FIG. 4). This provides a stop action which insures that the pad holder assembly 24 mounting the pad 22 rotates, as a unit, with the drive shaft 12 via the coupling device 30. Accordingly, it will be seen that the turning force or torque is relatively nominal as the lugs 20 ride up the first ramp surfaces 62 and then this force or torque progressively travels as the lugs 20 ride along the surfaces 64 and then finally into camming and deformable biting engagement with the relatively steep inclined surfaces 66 so that the plate member 38 is drawn into tight locking engagement with the drive of hub 18 of the drive shaft 12 to complete the automatic self-locking engagement between the component parts.

To remove the pad holder assembly 24, the machine is simply tilted back until the pad 22 clears the link surface and the drive shaft is again actuated by the operator and then immediately stopped. This stopping action of the machine causes inertia forces in the pad holder assembly 24 which develops a reverse torque. This reverse torque pulls the lugs 20 away from the biting engagement with the inclined surfaces 66 and then across the generally planar surfaces 64 and down across the inclined surfaces 62 and through recesses 48 such that the coupling device 30, in effect, spins-off the associated lugs 20 of the drive shaft 12 for automatic removal thereof. During this uncoupling, the operator need only give the switch one or two quick actuations of the drive motor.

The embodiment shown in the foregoing drawings is given to illustrate one example of the invention, it being apparent that various other structural arrangements could be utilized in accordance with the principals of the present invention. As an example, the lug 20 arrangement of the drive shaft 12 could be modified with any size and/or shape of lugs and any arrangement and/or number of such lugs in accordance with the principals of the invention. Also, it will be seen that the coupling device 30 of the invention can be used with any type of brush or pad holder and hence, may be utilized with a brush or pad holder which does not incorporate a riser block member 34, but wherein the coupling device is connected directly to the block member 32. Other advantages and objects of the invention will become apparent when reference is made to the following claims.

I claim:

1. A coupling device adapted for use with floor maintenance machines of the type which detachably mounts a brush or pad holder member for carrying a cleaning element, such as a brush or the like, which machine includes a drive shaft having a plurality of integral, drive lugs projecting radially therefrom, said coupling device comprising a plate member having a generally circular opening extending therethrough, said opening having a plurality of circumferentially spaced, arcuate recess portions adapted to receive said drive lugs therethrough, said plate member including a first series of inner peripheral cam-like ramps which communicate at one end with said recess portions on one side of said plate member, and a second series of inner peripheral cam-like ramps communicating with the opposite ends of said recess portions and on the opposite side of said plate member, said second series of cam-like ramps each including multiple tapered surfaces which terminate in integral, arcuate, segmental web portions disposed generally axially opposite associated of said first series of cam-like ramps which ramps and web portions coact for automatic coupling and de-coupling of said plate member relative to said drive shaft lugs.

2. A coupling device in accordance with claim 1, wherein said plate member is of a unitary, one-piece circular construction.

3. A coupling device in accordance with claim 2, wherein said plate member includes a plurality of apertures adapted to receive fastening means for detachably mounting said plate member with said holder member.

4. A coupling device in accordance with claim 2, wherein said first series of cam-like ramps each include downwardly and inwardly (FIG. 5) inclined ramp surfaces which terminate at said recess portions adapted for guiding said drive lugs downwardly and inwardly through said recess portions upon rotation of said drive shaft.

5. A coupling device in accordance with claim 4, wherein said inclined ramp surfaces extend generally helically downwardly and inwardly (FIG. 5) toward said recess portions.

6. A coupling device in accordance with claim 2, wherein said second series of cam-like ramps each include a first series of inclined lead-in surfaces, intermediate generally flat surfaces and trailing tapered surfaces, said trailing surfaces terminating at said web portions.

7. A coupling device in accordance with claim 6, wherein said trailing tapered surfaces providing a deformable abutment means for engageable coaction by said drive lugs for limiting relative rotational movement of said drive lugs in a direction toward associated of said web portions.

8. A coupling device in accordance with claim 1, wherein said recessed portions are disposed symmetrically around the inner periphery of said opening and are defined by end walls which extend divergently outwardly in a direction toward the longitudinal central axis of said plate member.

9. A coupling device in accordance with claim 1 wherein, said second series of cam-like ramps have a greater circumferential dimension as compared to the corresponding circumferential dimension of said first series of cam-like ramps.

10. A coupling device in accordance with claim 1 wherein, said second series of cam-like ramps have axial thickness greater than the corresponding axial thickness of said plate member, and said web portions having a greater axial thickness than the corrresponding axial thickness of said plate member and said second series of cam-like ramps.

11. A coupling device in accordance with claim 1 wherein, said first series of cam-like ramps each including generally helically oriented surfaces which taper downwardly and inwardly (FIG. 5) in a generally helical direction toward the associated of said recessed portions.

* * * * *